United States Patent [19]
Hait

[11] Patent Number: 5,691,532
[45] Date of Patent: Nov. 25, 1997

US005691532A

[54] PHOTONIC HETERODYNING HAVING AN IMAGE COMPONENT SEPARATOR

[76] Inventor: John N. Hait, 7085 Charmant Dr., #39, San Diego, Calif. 92122

[21] Appl. No.: 715,220

[22] Filed: Sep. 17, 1996

[51] Int. Cl.$^6$ ........................................... H01J 40/14
[52] U.S. Cl. .................. 250/214 R; 250/216; 356/349; 359/577
[58] Field of Search ................ 250/214 R, 214 LS, 250/216; 359/577, 583, 586, 589; 356/349, 359–361, 363, 348; 364/807–809, 713, 822–826

[56] References Cited

U.S. PATENT DOCUMENTS

4,796,999  1/1989  Schuster et al. .................. 356/394
5,323,406  6/1994  Yee et al. .......................... 372/26

*Primary Examiner*—Que Le
*Attorney, Agent, or Firm*—Leonard D. Schappert

[57] ABSTRACT

A means and method of photonic heterodyning wherein at least one photonic beam set having fundamental frequencies to be heterodyned is used to produce a dynamic interference image that is projected onto an image component separator. Energy from selected portions of the dynamic image is separated into at least one output. Energy components within the dynamic image move relative to the separating locations as determined by the fundamental input frequencies. This causes intermodulation of the input signals and the development of energy at the sideband frequencies in the output (s). Special Interference is also used to provide amplified photonic heterodyning.

6 Claims, 3 Drawing Sheets

PHOTONIC HETERODYNING HAVING AN IMAGE COMPONENT SEPARATOR

REFERENCES

This application is not a continuation or continuation-in-part of any other application; however, U.S. Pat. No. 5,466,925 and its priority document application Ser. No., 08/357,460, are hereby incorporated by reference.

BACKGROUND OF THE INVENTION

1. Technical Field

The present invention relates to photonic signal heterodyning and its use in interference-based computers and photonic signal processors.

2. Background Art

Historically, heterodyning of photonic signals has involved the use of a nonlinear element. In the radio and microwave portions of the spectrum, diodes, vacuum tubes, and electronic transistors have been used as mixers for the production of sum and difference sideband frequencies. In these cases, energy from two or more fundamental frequencies either is combined as waves which are convened to electronic signals in an antenna or waveguide probe, or is otherwise provided to the nonlinear mixing element as electronic signals.

In the regions above microwave frequencies, to which applicant herein refers generally as "optical," mixing is much more difficult because such high-frequency signals cannot be easily converted to electronic signals for processing. Nonlinear optics are the most popular method of direct optical heterodyning. Birefringent materials have the property of providing a dual index of refraction. As a result, two fundamental frequencies that have been indexed/matched to the particular material are able to phase-match within the material and reinforce each other so as to produce the desired sidebands.

Both the electronic methods and the nonlinear optical methods have important drawbacks that prevent full-spectrum utilization of heterodyning. The electronic means do not work at optical frequencies, and nonlinear optics must be indexed/matched to the specific frequencies used; this phenomenon prevents tuning across the optical bands as one would in the radio bands.

Heterodyning consists of mixing two fundamental frequencies in such a way as to produce sum and difference sideband frequencies. However, the simple superposition of two electromagnetic waves does not usually cause mixing. As a result, the prior art does not provide for a versatile method of heterodyning using photonic signals directly.

The applicant's U.S. Pat. No. 5,093,802 introduced interference-based computing. Devices using its methods and subsequent interference-based methods have come to be called "photonic transistors," even though the methods will also work with non-photonic energy. Basically, photonic transistors are composed of multiple interfering photonic beams that produce a dynamic interference fringe or image that changes continually in accordance with input information modulated onto the input beams. A separator means is used to separate energy from the dynamic image to provide an output. The type of function produced depends upon information modulated into the input beams and the positions within the dynamic image from which energy is taken. Signals are not converted from photonic to electronic, but remain as electromagnetic waves throughout the entire process.

A great variety of interference-based computing devices can thus be produced using photonic transistors. See copending U.S. application Ser. No. 08/357,460, which details the use of "Special Interference." Photonic transistors that use Special Interference rather than Young's interference, as taught in issued U.S. Pat. No. 5,093,802, are able to produce an even greater variety of components. However, issued U.S. Pat. Nos. 5,093,802 and 5,466,925 and application Ser. No. 08/357,460 do not address the issue of heterodyning. The present invention details interference-based heterodyning and its incorporation into other photonic transistor processes and the results therefrom.

SUMMARY OF THE INVENTION

The present invention is a means and method of photonic heterodyning (mixing and detection) that is able to use energy over a much broader range of the electromagnetic spectrum than can previous methods that use optical and/or electronic means. It does not require an energy conversion to electronics, nor does it require the use of birefringent optics. It has the additional advantage of high-speed interaction because the electromagnetic waves used do not need to be slowed within a birefringent medium. The present invention is completely vacuum-compatible and is able to operate at the full speed of light in vacuo.

In the present invention, photonic energy having at least two fundamental frequencies to be heterodyned together is superpositioned so as to form a volume of dynamic interference which is projected as a dynamic interference image onto an image component separator. Fluctuating energy components relative to specific locations within the image component separator interact so as to provide energy at the sideband frequencies which are the results of photonic heterodyning. Energy having the sideband frequencies is then separated out of the dynamic interference volume to produce at least one output. All of this is accomplished without converting the photonic signals to electronic signals as in radio and without the use of wavelength-matched birefringent optical materials.

The present invention is a method of photonic heterodyning comprising the following steps:

1) producing at least one input beam set of photonic energy having first and second fundamental frequencies to be heterodyned;

2) producing a dynamic interference volume using energy of said at least one input beam set, and 3) separating sideband energy from at least one location within said dynamic interference volume to provide at least one photonic output, said sideband energy being produced by movement of energy components within said dynamic interference volume relative to said at least one location.

In the first step a "beam set" is provided having the fundamental frequencies to be heterodyned. The beam set can be a set of one, a single photonic beam of a first fundamental frequency with the second fundamental frequency modulated onto it, using frequency, phase or amplitude modulation. It can also be a set of two photonic beams where each beam is at a different fundamental frequency. The set can also be made up of multiple beams such as the beam sets projected from the individual pixels of a hologram. In this case the complete set of input beams can contain the fundamentals in any of the above arrangements.

In the second step, a three-dimensional dynamic interference volume is produced by the superposition of energy from the input beam set onto itself. Dynamic energy distributions within the dynamic interference volume are then used to produce photonic heterodyning.

In the third step, energy from selected locations within the dynamic interference volume are separated to provide the sideband energy-containing output. The separator can be as simple as a mask with a hole in it that allows energy to pass into the output from a certain location from within the dynamic interference volume.

The basic concepts of heterodyning are as old as music. Every guitar player uses the beat note between adjacent strings to tune his instrument. Yet to do that same thing with photons is a unique concept. The sound waves coming from the two strings intermodulate at the position of the musician's ear causing the eardrum to resonate at the beat note, or in radio terminology, the "sideband."

The crux of the present invention lies in an understanding of the dynamics of energy distribution that occurs when photonic signals are used to produce interference. Under ordinary circumstances, when two beams of light cross, the energy distributions that occur at the crossing point are such that the effects of intermodulation are either canceled or greatly subdued so as not to be noticed. However, when a dynamic interference volume is produced, the energy distributions that result from superposition are spread out into the entire volume of the dynamic image. This spreading allows the present invention to take advantage of energy differentials that occur between different locations within the volume. These dynamic energy differentials are then used to produce the frequency intermodulation that produces heterodyning.

Dynamic energy distributions within the dynamic interference volume are controlled by the frequency, phase, and amplitude variations of the input energy. These dynamic energy distributions are quite complex. However, the case where the fundamental frequencies are supplied as separate photonic inputs easily illustrates how these dynamic energy differentials are put to work in the present invention.

Whenever two photonic input signals having differing fundamental frequencies are used to make a dynamic interference volume, the constructive interference (CI) and destructive interference (DI) components of the dynamic interference sweep back and forth through the volume and, as a result, across the image component separator onto which the dynamic interference image is projected.

As the CI and DI parts of the dynamic interference sweep back and forth across the output opening, the energy directed through the hole and into the output becomes alternately bright and dim. This produces an intermodulation of the fundamental frequencies, amplitude modulating the output energy that makes it through the hole in the mask. This, in turn, causes the development of energy at the sideband frequencies according to the principles of Fourier harmonic analysis. When multiple modulation components are available from the input beam set, intermodulation occurs within the dynamic interference volume as the activities of the CI and DI locations become more complex. This results in a spectral separation that concentrates sideband energy into certain pans of the dynamic interference volume. As the CI and DI parts of the dynamic image move throughout the entire volume, there may be multiple locations within the volume and the projected image wherein the desired sideband production produces sideband energy that is in phase, or can be adjusted using passive elements at those locations to make it in phase, with sideband energy being developed at other places.

The present invention utilizes this effect by separating energy from many such specific locations in order to enhance the output with the inclusion of phase-adjusting passive elements in the image component separator. Sideband energy can be separated, phase adjusted, and then concentrated into a single more powerful output.

Thus, in step 3) of the method described above, said at least one location is a plurality of locations that are used in the next two steps:

4) phase-adjusting said sideband energy at each of said plurality of locations, and 5) directing said phase-adjusted sideband energy to at least one common location to provide a strengthened photonic output.

Photonic heterodyning is particularly valuable when the input beam set contains encoded information. The results are as in radio without the conversion from photonic energy to electron flow. Thus, step 1) above can be modified so that at least one of said fundamental frequencies is modulated with encoded information and said second fundamental frequency is a continuous-wave subcarrier modulated onto said first fundamental frequency, thereby modulating said sideband energy with said encoded information.

The purpose here is to transfer information from one frequency channel to another frequency channel. This is accomplished by the addition of a continuous-wave subcarrier to the dynamic interference image. This subcarrier is added to the volume through modulation of some or all of the photonic energy at the subcarrier frequency before the dynamic interference is formed.

This produces an all-photonic effect similar to a mixer stage of a superheterodyne electronic receiver. The subcarrier is comparable to the "local oscillator" in the electronic receiver, while the incoming photonic beam set provides the input information carrier. The intermediate frequency (IF), though, is all-photonic in the present invention.

The frequency of the continuous-wave subcarrier can be made adjustable, thereby making the frequency of said sideband energy adjustable.

These phenomena enable the present invention to be used like an all-photonic tuneable radio receiver. Whereas it is difficult to produce a tuneable optical signal, the growing body of photonic transistor technology provides ways to modulate a photonic beam in order to provide the needed local oscillator frequency for the present invention configured as a mixer.

One of the most important tools for enhancing the present invention is Special Interference as described in U.S. application Ser. No. 08/357,460, which is incorporated herein by reference. A portion of this application is quoted below.

Special Interference is produced within dynamic interference whenever energy flow patterns conform to the tenets of Special Interference. In the production of amplification using Special Interference as described in copending application Ser. No. 08/357,460, a portion of the input beam set consists of a substantially constant "power beam" directed toward certain "first locations" within the dynamic interference volume and not to certain second locations from where the output is to be taken. When a modulated beam of substantially the same frequency comes on, DI occurs at the first locations, diverting energy into the output locations. The output has more energy than the modulated input beam but retains its modulation patterns, and is therefore an amplified output.

To include Special Interference amplification in the present invention, the substantially constant power is provided to the input beam set at the sideband frequency to be amplified. The input optics are positioned and oriented so that sideband energy is not directed into the output locations of the image component separator, but to "first locations" as in the description of Special Interference.

When the two fundamental frequencies are supplied as described above, sideband energy is produced at the same "first locations" which is out of phase with the energy from the power beam at those locations. This causes DI between the heterodyne-produced sideband energy and the power beam sideband energy, producing a redistribution of sideband energy within the dynamic interference volume and into the output. As in ordinary Special Interference amplification, the output signal is amplified; however, because of the addition of heterodyning to the process, the device operates as an amplifying mixer.

For production of amplified photonic heterodyning, step 1) above is preceded by the following step:

providing a power beam set having at least one substantially constant level beam of photonic energy at the frequency of said sideband energy;

Additionally, step 2 is modified so that:

said dynamic interference is produced using energy of said input beam set and said power beam set, and Step 3 is also modified so that:

said sideband energy separated from said at least one location within said dynamic interference conforms to the tenets of Special Interference amplification, thereby providing a method of amplified photonic heterodyning.

The beam-combining means that produce the dynamic interference can be made of any passive element(s) consistent with the frequency of photonic energy being used. Holograms, and in particular computer-generated holograms, are especially useful as they can be made to operate in vast portions of the electromagnetic spectrum from radio frequencies to X-rays and beyond. Other such elements which can be used include reflectors, refractors, lenses, prisms, and diffraction gratings, as well as any other optical element capable of performing the task.

The image component separator can consist of any number of passive elements that enable energy from selected portions of the dynamic interference to pass along one or more output paths into the output while preventing energy from other locations within the dynamic interference volume from entering the output. Examples of image component separators which can be effectively utilized include masks, transmission and reflection holograms, strategically placed mirrors, lenses, prisms, and diffraction gratings, as well as other optical elements capable of operating as image component separators. These permit a large number of locations having somewhat differing characteristics to be used to produce a combined output. For example, phase holograms can be used to phase-adjust sideband energy taken from various locations within the dynamic interference volume and then redirect that energy into an enhanced combined output.

One of the most important uses of photonic heterodyning is the transferring of frequency-multiplexed information from one channel to another in order for information in one frequency-multiplexed photonic logic circuit to interact with information from a different channel. In order to accomplish this, a single photonic carrier signal is double-modulated with both the subcarrier information and the encoded information as described above. The output data then appears in the new channel.

The following quotations from U.S. application Ser. No. 08/357,460 explain the tenets of Special Interference used in the present invention. (Abbreviations: di=destructive interference, ci=constructive interference.)

(from page 2 line 4)

"These special interference phenomena are produced whenever the geometry of the apparatus is such that energy from a plurality of beams causes destructive interference at the first location(s) where energy from the input beams appears when any one of the input beams is on by itself. Since the law of conservation of energy requires that the energy in the beams not be destroyed by the destructive interference, when an out-of-phase beam is on, the energy must appear somewhere else. Depending on the geometry of beam superposition, the energy will be reflected, or diverted to a position adjacent to the first location(s), or at some angle in between. The important result is that energy from the plurality of beams is actually diverted away from the first location(s) where destructive interference occurs and on to a second location where constructive interference occurs, outside of the area where at least one input beam appears in the absence of interference.

In the most elementary examples, having only two input beams, two types of special interference are manifest. With the first type, neither of the input beams contribute energy to the second location when either one is on by itself. When both input beams are on, interference causes energy from both beams to appear at the second location.

With the second type of special interference, the first input beam contributes no energy to the second location when it is on by itself. When the second input beam comes on, interference causes energy from both input beams to appear at the second location. However, energy from the second beam does appear at the second location when it is on by itself.

Some embodiments and applications of the present invention is able to use either type of special interference. There are some things, however, that require one type or the other, but will not work for both types; e.g., the logical AND, discussed below.

The individual beams, in either type of special interference, actually produce images at the locations where interference takes place, even if these images are just simple spots. These images then interfere with each other.

In complex images, one or more input beams are able to produce image component area(s) that correspond to the simple examples above. The inputs are subsets of a plurality of input beams that form images. When only one beam set is on, and as a result its image is on, the energy pattern defines a set of 'first' locations by the presence of energy. When at least two of the subsets are on, interference occurs between the two images, and energy from both images is removed from the first locations by destructive interference. That energy then appears at the second location(s) because of constructive interference. The second locations lie outside of the area where the first locations are.

Holograms, especially but not exclusively computer-generated holograms, like other pictures, are made up of individual pixels. From each pixel comes a group of rays that eventually combine to produce the wave-front reconstructed holographic image. As a result, each spot on the image is produced by a group of rays from the hologram. The rays constitute a set of beams. When a whole set of beams are modulated in concert, the image it produces, and the complex interference that occurs between it and other images is also modulated. Interference between such images, made by subsets of all input beams, are also able to be used to produce the special interference phenomena used by the present invention.

The important difference between these special interference phenomena and Young's fringes used in the prior art is that energy from at least one of the input beam sets, which appears at the second location(s), appears while interference is occurring, and does not appear at that location(s) in the absence of interference. On the other hand, the input beams used in Young's fringes do appear at that second location(s) in the absence of interference, when any of those beams are on by themselves.

These special phenomena are analog in nature, in that the amount of energy that appears at the second location(s) is proportional to the amount of energy in the two input beams or images. The energy appearing at the second location(s) has been diverted from the first location(s).

If one input is held constant, and a second input(s) is increased, the amount of energy contributed to the second location(s) from the first input(s) reaches a limit where the addition of more energy in the second input(s) is unable to cause more energy from the first input(s) to appear at the second location(s).

The phenomena may be utilized in digital energy circuits through the use of discrete levels for modulating the input beams, to establish discrete states of the interference images, having discrete amounts of energy in their component parts."

(from page 49 line 12)

"38. Basic theory of operation

Applicant theorizes that the amplitude and intensity of energy at the purely constructive interference locations, using the first type of special interference, are able to be calculated using an adaptation of the standard vector sum of amplitudes method used with other interference phenomena.

The basic formula for intensity has been derived from the law of cosines and considers just two incoming rays.
That formula is: A=amplitude of the first beam. B=amplitude of the second beam. Theta=phase difference between the two beams.
Intensity=$I = A^2 + B^2 + 2AB \cos(\text{Theta})$ The Total amplitude $T_{ci}$=square root of I, just as $A^2$=the intensity of amplitude A.

At the center of the constructive interference (ci) area, Theta=0, and the Cos(Theta)=+1. At the center of the destructive interference (di) area, Theta=180 degrees, and the Cos(Theta)=−1. As a result, the vector sum of two amplitudes at these two locations is also the algebraic sum of the amplitudes.

The two rays are in phase in the ci area, so the sum has that same phase. As a result, the ci intensity formula is,
$I_{ci} = A^2 + B^2 + 2AB = (A+B)^2$ In the di area The two rays are out of phase in the di area, so that the vector sum is the difference of the two amplitudes, which takes on the phase of the largest of the two. If they are equal, the algebraic sum is zero. The di formula for intensity becomes:
$I_{di} = A^2 + B^2 - 2AB = (A-B)^2$ These two conditions are also able to be viewed as the vector sums of three different rays, which will be labeled $B_1$, $B_2$, and U. In the di area, $B = -B_1 = B_2$, so that U is the difference between A and B, and $A = B + U$ When A is on by itself, the amplitude at location 1 is the vector sum of $B_1$ and U. The intensity is $(B_1+U)^2$.

When beam $B_2$ comes on it combines with the first two. Since it is 180° degrees out of phase with $B_1$ and U, the totals of amplitude and intensity are as shown in formulae 1.

Formulae 1, di location for all of the interference types:

$T_1 = T_{di} = B_1 + U - B_2 = U$ $I_1 = I_{di} = (B_1 + U - B_2)^2 = U^2$ also, by substitution we get:

$$I_1 = I_{di} = A^2 + B^2 - 2AB = (B+U)^2 + B^2 - 2B(B+U)$$
$$= B^2 + 2BU + U^2 + B^2 - 2B^2 - 2BU$$
$$= U^2$$

This is exactly what is expected because the amplitudes add algebraically, and the intensity is the square of the amplitude.

This indicates that the addition of an out-of-phase beam smaller than the first beam leaves energy having an amplitude equal to the difference of the two. If it is viewed as the sum of three beams, two of which are equal in amplitude but of opposite sign, the third beam is equal to the amplitude of the energy remaining at this location after all three have been summed.

The process of interference relocates energy within a fringe image. The equivalent amount of energy that is missing from the di areas appears in the ci areas. As shown above, when two unequal beams interfere destructively, not all of the energy in the di areas is relocated into the ci areas. The remainder is exactly equal to the difference between the two unequal beams. This remainder has not been relocated; it continues to arrive at the di location. As a result, this remaining energy is able to be called 'undiverted' energy, because it has not been diverted into the ci areas by the interference.

As a result, one is able to describe the energy which is apparently missing from the di area as 'diverted' energy.

In Young's ci area:

In the case of Young's type interference, the amplitude of energy arriving at a second location, namely the ci area, when only one beam is on is A. A is able to be considered as the sum of two amplitudes $B_1$ and U.

Again, when beam $B_2$ comes on, it combines with the first two. Since it is in phase with $B_1$ and U, $B = B_1 = B_2$, and the totals of amplitude and intensity are as shown in formulae 2.

Formulae 2, Young's interference type in either amplification or saturation:

$T_2 = T_{ci} = B_1 + U + B_2 = 2B + U$ $I_2 = I_{ci} = (B_1 + U + B_2)^2 = (2B+U)^2$ also, by substitution we get:

$$I_2 = I_{ci} = A^2 + B^2 + 2AB = (B+U)^2 + B^2 + 2B(B+U)$$
$$= B^2 + 2BU + U^2 + B^2 + 2B^2 + 2BU$$
$$= 4B^2 + 4BU + U^2$$
$$= (2B+U)^2$$

This is also exactly what is expected because the amplitudes add algebraically, and the intensity is the square of the amplitude.

In this case, Young's type interference has energy directed to this ci location when only one beam is on. It is able to be viewed as having two components. When the second beam comes on, energy from the di area is diverted into the ci area. As shown above, the amount added to the ci area by interference exactly equals the amount removed from the di area.

As a result, two equal parts exist, $B_1$ and $B_2$. One came from beam A and the other from beam B. The difference between the two is U.

In both the ci case and the di case, U remains unchanged. It has been called 'undiverted' energy. Apparently, it remains unaffected by the interference that is taking place between $B_1$ and $B_2$, even in the ci area.

If B rises to become equal with A, U drops to zero at both places. The resulting interference image goes completely dark at the di location, and the intensity at the ci location goes to $4A^2=4B^2$. All of the energy contributes to the interference image.

When A and B are not equal, the image formed is able to be viewed as being the sum of two images. One image is the interference image formed by portions $B_1$ and $B_2$ in the familiar interference fringe pattern. The other image is a consistent spot, having no contrast change from one part to another; its amplitude equals U, and its intensity is $U^2$.

As a result, U, the difference between two unequal beams, can rightly be called "undiverted," for it arrives at the same locations and in the same pattern as when $B_1$ and B2 are off.

$B_1$ and B2 are rightly called 'diverted' energy, because this energy has been rearranged, or 'diverted,' in order to form the interference image. In that image, the energy from the di location is diverted into the ci location to combine with an equal contribution from the other beam that will arrive there anyway in the absence of interference.

In special interference

Next, we examine special interference. Special interference has no contribution to location 2, the ci location, when only one beam is on. This occurs because the beams are small in comparison to the di location, and are directed only toward the di location, and are not spread out to cover the location where ci will eventually take place.

The di area functions exactly as described above, as having two in phase beams from A, with the out-of-phase B.

The ci area has no energy in the absence of interference. Most importantly, it has no 'undiverted' energy (that is, U=0).

When the second beam ($B_2$) comes on, interference occurs producing an interference image that removes energy from the di location, ($B_1$–$B_2$), leaving U as residual energy.

The energy removed from the di location is diverted into the ci location as $B_1$+$B_2$. It has an intensity of $(B_1+B_2)^2$.

Again by substitution we get $$I_2 = I_{ci} = A^2 + B^2 + 2AB = (B+U)^2 + B^2 + 2B(B+U)$$
$$= B^2 + 2BU + U^2 + B^2 + 2B^2 + 2BU$$
$$= 4B^2 + 4BU + U^2$$
$$= (2B+U)^2$$

However, U=0 at this location, producing the important relation as shown in formulae 3.

Formulae 3, first interference type in either amplification or saturation:

$$T_2=2B$$

$$I_2=(2B+0)^2=4B^2$$

As a result, a formula for the first type of special interference has been derived for both the amplitude and the intensity.

The total amount of energy in any one application depends upon the area of ci and the area of di, because they are able to be made up of many rays, even thousands or billions of rays. The total energy is able to be expanded to cover large areas, or focused to small areas. The output characteristics will be a function of the size, locations, and the ratio of output area to image area of the image component separator relative to the image. Contributions of energy from the other parts of the image that are not pure ci or di also contribute to the overall operation of the invention.

The importance of these formulae to the process of amplification and limiting cannot be overstated. As an example, a substantially constant power beam A that is directed to location 1 and a control beam B (which is smaller than A) produce an interference image at locations 1 and 2, with di at 1, and ci at 2.

The output intensity is $4B^2$, and the amplitude is 2B. It does not matter how much larger A is than B, within the limits of the breakdown of the optics or other factors that would physically change the arrangement. Energy diverted into the output is directly proportional to the control beam B.

When the control beam is amplitude modulated, the output is also amplitude-modulated, having twice the amplitude of the control beam. The energy in the information carrying portion of the output waveform has been doubled. Unlike the amplifier of the prior art that uses Young's interference, the present invention does not produce the residual output U, the undiverted leftover energy that does not contribute to the interference image.

As long as the modulated beam is smaller than the constant beam, the output will be amplified. The output amplitude is always double the smaller of the two.

Next consider what happens when the modulated control beam rises above the level of the constant power beam. With B>A, for any given instant the output will be twice the smaller of the two. It is the same as switching the beam names in the formulae above. Because the smaller one is also the constant one, the output will be a constant 2A no matter how highly B is modulated, again within the realm of not destroying or modifying the optical arrangement. This condition is called 'saturation.' All of the energy from beam A that is able to be has been diverted into the output.

As a result, the amplification curve of the present invention is NON-LINEAR. Non-linear optics that operate at the speed of light is able to accomplish many tasks that are otherwise impossible. A modulated waveform will be limited and clipped at the point where the two input beams are equal.

Second type of special interference

The second type of special interference is also able to be viewed as having three component amplitudes. The power beam (A) is directed to the di location; none of it is directed to the ci location, just as with the first type of special interference.

The control beam (B) is directed to both locations. For that reason, this type of interference will not produce a logical AND in a single stage; however, it makes an excellent amplifier.

When the control beam is off, $I_2=0$, and $I_1=B_1+U$.

When the control beam is less than the substantially constant power beam, $A=B_1+U$, and $B=B_2$. The amplitude at location 1 will be $B_1+U$.

Formulae 4, 2nd interference type in amplification $$\text{Amplitude}=T_2=B_1+B_2=2B$$

$$\text{Intensity}=I_2=(B_1+B_2)^2=4B^2$$

This is the same as with the first type of special interference. The difference appears when the arrangement goes into saturation. When that occurs, the undiverted energy (U), which equals B−A (because B is larger) does not come from the power beam. In this case the residual energy comes from the control beam which is directed straight into the output. As a result, the output during saturation is as shown in formulae 5.

Formulae 5, 2nd interference type in saturation $$\text{Amplitude}=T_2=B_1+B_2+U=2B+U=2A+U$$

$$\text{Intensity}=I_2=(B_1+B_2+U)^2=4A^2+4AU+U^2$$

Amplification is reduced because A is constant. All of the available energy of the power beam has been diverted into the output. Further increases in B only increase the size of U, which is not doubled. When squaring to produce the intensity, the 4AU factor indicates that there exists some interaction with energy from other parts of the interference image, but U remains the same.

As a result, this second type of special interference behaves like the first type of special interference when B<A. However, it behaves like Young's interference when B>A. Amplification is still limited somewhat, but it is not clipped.

Broad band and narrow band arrangements

The above-described process is phase-dependent. The energy removed from the di location is relocated in the ci position. But what if the signals arrive at the first location at some other phase? In this case, the ci position is at some other location, resulting in near binary operation of a phase-modulated signal. The inputs would have to be exactly out of phase in order for the ci location to be the same as the output location.

In practice, the optics used will have to be engineered in wavelength units and wavelength sizes. Most optical arrangements rely on an averaging of energy from multiple points of the cross-section of an input beam. Averaging of energy from these multiple points produces the familiar sinusoidal interference fringe.

If the amplifier is engineered to include a large number of such points so as to use the averaging principle, then it will have a wide bandwidth and will be able to function using a number of input frequencies. The output locations function as if a group of controllers were placed side by side, each one using an individual ray set.

In this case, the output hole includes a large number of wavelength size locations. For slightly different phases and slightly different frequencies, the ci location from each pair of input locations will be at slightly different output locations. If those output locations happen to be within the area of the hole, the energy will output. If they are not, it will not.

Modern optics is capable of operations at wavelength sizes. Wavelength size input beams and wavelength size output holes will produce processes that operate considerably differently from the multiple-location averaging style of optics. The more precise the optics are, the more precisely phases and frequencies must be in order for the ci area to hit the output hole.

Wavelength size precision will cause a phase-modulated signal to output only when the phase is close enough to 180, at the first location, in order for the ci area to hit the wavelength size output hole. The output from an analog phase-modulated signal would be a binary output that occurs only when the two inputs are exactly out of phase.

If multiple frequencies are used, the only ones that will be able to hit the output hole will be those that match the wavelength geometry so that the ci location is where the tiny hole is.

As a result, each method and each device must be engineered to produce the type of amplifier needed. If a phase demodulator is to operate with an analog input, it will have to be of the averaged, multiple location (broad band) type. If it is to be used in a binary circuit, then the single wavelength-size location (narrow band) type will work quite well.

It is possible to produce a considerable number of composite operations by using a number of wavelength-size controllers having a common first location, but separate output locations; thus, a variety of signals are able to be handled all at once.

A frequency division demultiplexer is able to be produced by inputting the beams from different locations directed to a common location. Each different frequency will produce its ci at a different output location. If each output location has its own output hole in the image component separator, a complex group of frequencies in the input will be separated into separate outputs. Meanwhile, it will filter out any frequencies in between, because no output hole is provided for those frequencies, and no matching input frequency is provided.

If the control input is directed to a common location and a number of power inputs are used, each having a different frequency and a different location, the geometry is able to be arranged so that the ci locations all match, producing a very accurate frequency-selectable filter. All frequencies that match a power beam will have their ci at the common output hole. All other frequencies will not. The difference between this arrangement and the broad band averaging arrangement is that each of the frequencies that pass through the filter must match precisely the frequency and phase of the power beam. At wavelength sizes, filters are capable of providing the best selectivity of any known means, especially at light wave frequencies and beyond.

These basic principles of operation produce functions similar to the way electronic transistors perform similar functions. As a result, the present invention warrants the common name 'photonic transistors.' Even though the present invention is quite capable of using non-photonic wave-type energy, photonic embodiments are expected to become the most common in operation."

The present invention clearly provides means and method having numerous benefits.

One of the objects of the present invention is to provide a means and method for accomplishing all photonic heterodyning.

Another object of the present invention is to provide a means for and method of transferring information from one photonic channel to another photonic channel without utilizing electronic components.

Another object of the present invention is to provide a means for and method of heterodyning optical signals without the use of electronic signals or birefringent optical materials.

Another object of the present invention is to provide a means for and method of heterodyning optical signals at the speed of light in vacuo.

The foregoing objects and benefits of the present invention will become clearer through an examination of the drawings, description of the drawings, description of the preferred embodiment, and claims which follow.

BRIEF DESCRIPTION OF THE DRAWINGS

Please note that the beam angles, sizes, and proportions are exaggerated herein so as to provide for clarity of understanding.

DESCRIPTION OF THE PREFERRED EMBODIMENT

Photonic heterodyning of the present invention is accomplished through superpositioning of energy from an input beam set containing the fundamental frequencies to be heterodyned so as to produce a dynamic interference volume. Energy is then separated from selected portions of that dynamic interference to provide an output containing photonic sideband frequencies.

Figure 1:
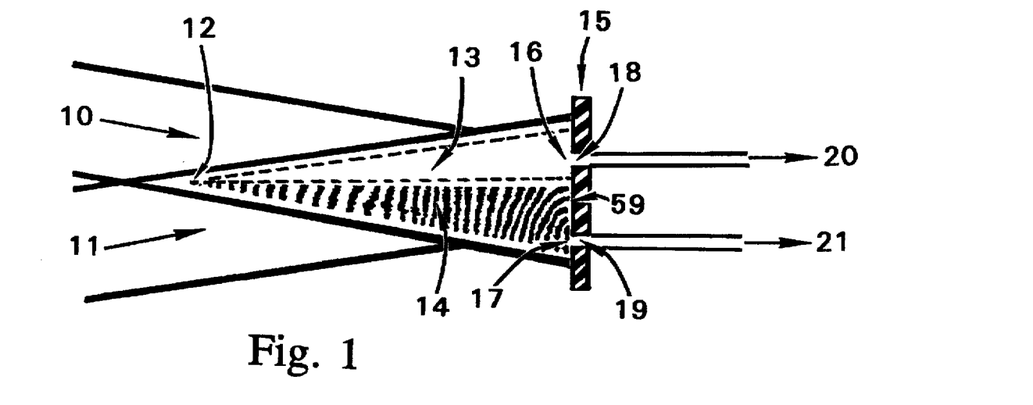
FIG. 1 is a cross-sectional view showing the photonic heterodyning device of the present invention.

FIG. 1 is an instantaneous cross-sectional view of one embodiment of a photonic heterodyning device of the present invention. It can be considered a modulator, a mixer or a detector, depending upon which frequencies the input beam set (made of input beams (10) and (11)) consist of.

Input beams (10) and (11) of input beam set (9) are aligned so as to superposition their energy beginning at location (12). Superpositioning causes interference to occur which is projected out from location (12) through the dynamic interference volume comprising volumes (13) and (14) and locations (16), (17), and (59), all of which are within the three-dimensional dynamic interference volume. As the input beam set changes, this interference becomes dynamic; i.e., it constantly changes.

The dynamic interference is projected onto image component separator (15) as a dynamic interference image. Image component separator (15) in this case is a mask having strategically placed holes (18) and (19) next to locations (16) and (17) within the dynamic image.

The image component separator (15) can consist of any passive element or group of elements, including reflection or transmission holograms, which are capable of separating energy from strategic locations within the dynamic interference, such as locations (16) and (17), and directing or permitting energy to enter one or more outputs such as outputs (20) and (21), while preventing energy from other locations within the dynamic interference volume and image from entering these same outputs.

The signals that appear in outputs (20) and (21) depend upon the energy distributions within the dynamic interference volume. The energy distributions over time depend upon the frequency composition of input beams (10) and (11). The exact energy patterns which exist at locations (16) and (17) and exit to outputs (20) and (21) also depend upon the size and positioning of holes (18) and (19) in separator (15) with respect to the dynamic image as projected onto image component separator (15).

As a first example, input beams (10) and (11) are separate photonic beams having different frequencies. At one instant in time, destructive interference (DI) is projected within the dynamic image from location (12) through volume (14) and onto image component separator (15). Because of the DI, any energy that passes through hole (19) and into output (21) is diminished.

At the same instant, constructive interference (CI) is projected from location (12) through volume (13) and onto image component separator (15). Because of the strategic location of hole (18) next to location (16), combined energy from the input beams (10) and (11) exits through hole (18) and into output (20).

Because of the frequency difference between input beams (10) and (11), at another instant in time, the DI and CI within the dynamic image have switched positions so that now the effects of DI are projected through volume (13), while CI is projected through volume (14). Consequently, output (20) is now diminished or even off, and the output at (21) is on.

Over time, the CI energy distribution, along with the projected DI within the dynamic image, sweeps back and forth across location (16) in a sinusoidal fashion. This makes output (20) alternately bright and dim, producing a sinusoidal modulation of output (20). The same phenomena occur between location (17) and output (21). However, because the frequency of the modulated output is dependent upon the fundamental input frequencies, this intermodulation between them produces signals having a modulated waveform in output (20) that is out of phase with the modulated waveform in output (21).

As Fourier explained in the last century, any modulated waveform can be reduced to a series of simple harmonic motions. In this case, the result is the production of two sideband frequencies that consist of the sum and difference frequencies. These sideband frequencies can then be filtered or other, vise used by a suitable subsequent device.

If one or both of the input beams (10) or (11) are externally modulated, the modulation pattern will appear in the sidebands. If, for example, input beam (11) is shut off, output (20) will contain only energy from input beam (10) having whatever frequency or frequency distribution input beam (10) originally contained. The sideband energy produced within the invention drops to zero. This is just as in electronics when a carrier wave is modulated with an audio or video signal, the difference here being that no conversion to electron movement is made. The energy remains photonic throughout the entire process.

When external modulation is applied to the input beam set, the dynamic actions of the CI and DI parts of the dynamic image move in a more complex fashion. Energy concentrations are displaced spatially within the dynamic interference volume and the dynamic image. The present invention is also able to take advantage of this feature of the interference process.

In a second example, location (16) is precisely located so as to take advantage of spectral separation by positioning hole (18) at the location where sideband energy is the strongest. With careful design of the dynamic image and careful selection of the output location(s), the sideband frequencies can be separated directly into output (20).

In a third example, the entire input beam set (9), including beams (10) and (11), are modulated externally to provide the second fundamental frequency. Again movement of energy components within the dynamic interference and the dynamic image produces sideband energy that is separated as described above. If encoded information is also included in the modulated waveform, that encoded information will also appear in the sideband energy of output (20).

The input beam set can consist of a large number of rays as would be projected from the pixels of a computer-generated hologram. The advantage of producing dynamic interference using holograms is that the structure of the dynamic image can be optimized for the intended input frequencies or bands that the mixer is to use.

Figure 2:
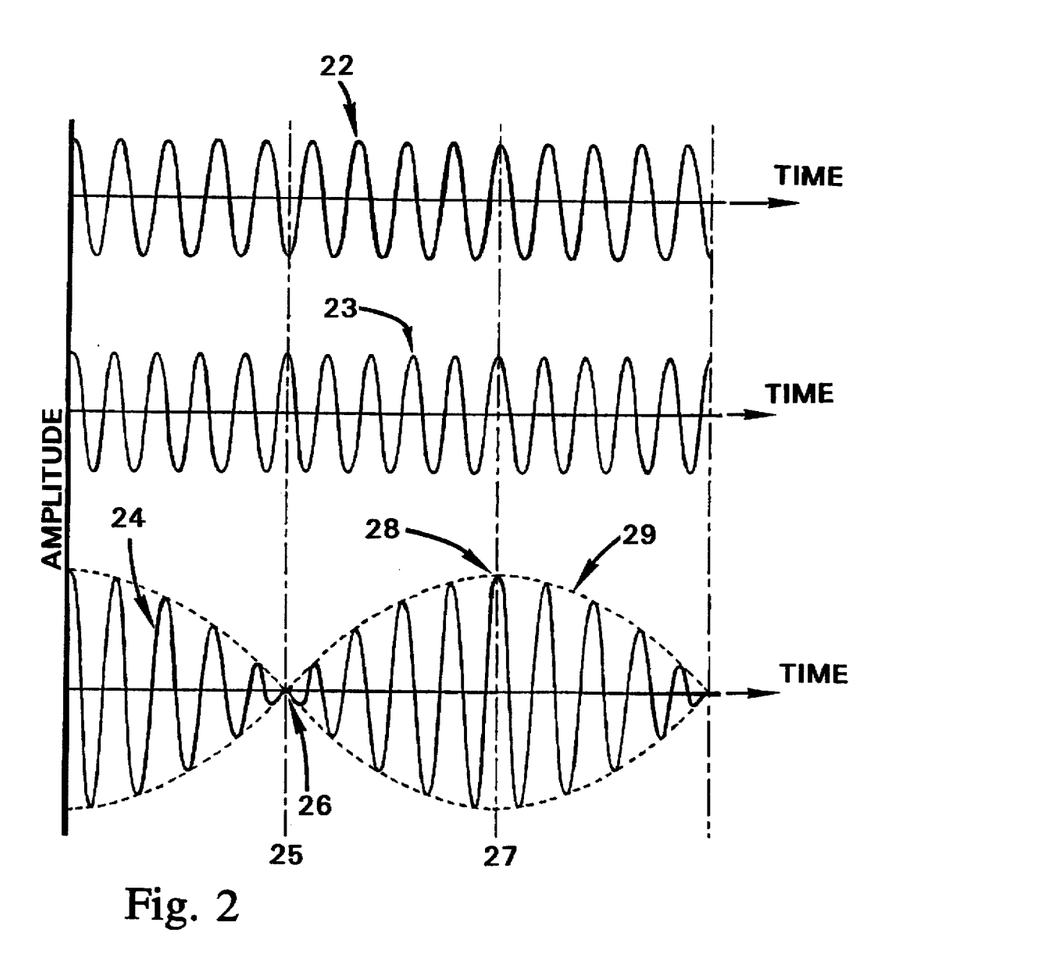
FIG. 2 is a graphical representation of the heterodyning process.

Ordinarily, the superposition of two electromagnetic waves of different frequencies does not produce noticeable heterodyning. Applicant theorizes that this is because any interactive effects between the fundamental frequencies are canceled by subsequent intermingling of energy. However, the dynamic energy distributions within the dynamic image provide an intermodulation of the input frequencies when the energy within the image interacts with the image component separator, producing an output waveform as depicted in FIG. 2. Compare FIGS. 1 and 2.

FIG. 2 is a graph of two photonic waves, having different fundamental frequencies (22) and (23), which are the frequencies of input beams (10) and (11) in FIG. 1. Interference between them, within the dynamic interference volume, produces waveform (24) in hole (18) and output (20) of FIG. 1. At time (25), waveforms (22) and (23) are out of phase at location (16); this reduces output (20) to its minimum (26) because of DI. At time (27), waveforms (22) and (23) are in phase at location (16); this raises output (20) to maximum (28) because of CI. The result is an amplitude modulation of output (20) as shown by waveform envelope (29).

Figure 3:
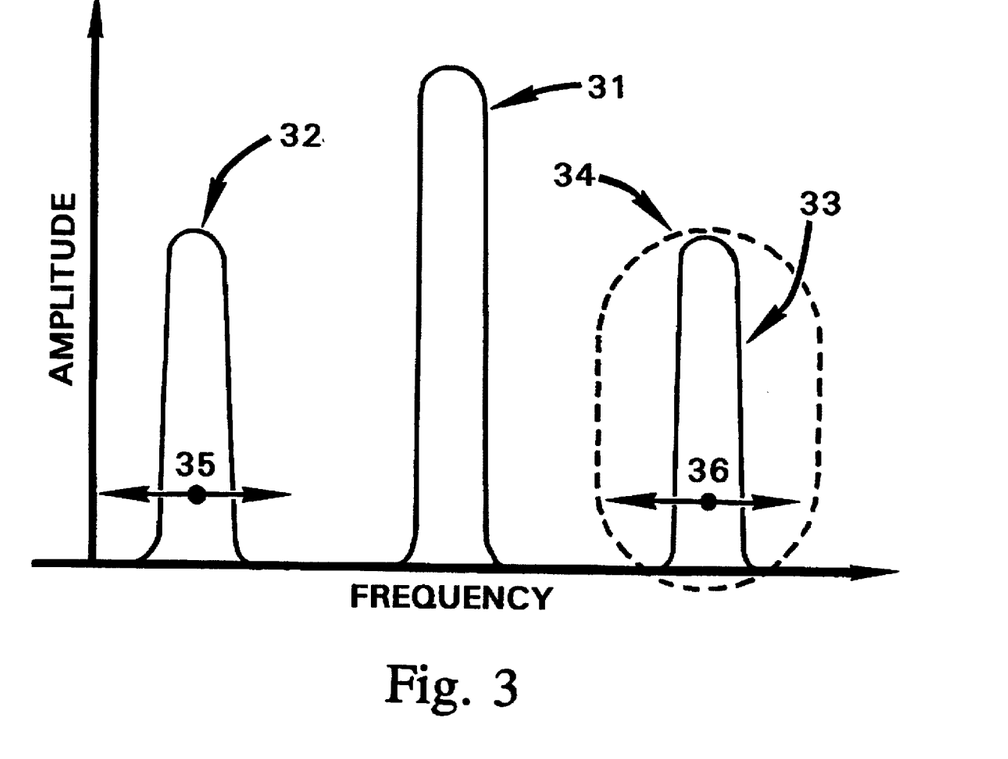
FIG. 3 is a frequency distribution graph showing one fundamental frequency and upper and lower sidebands.

FIG. 3 shows the effect of amplitude-modulating a photonic signal which causes energy to be removed from the fundamental carrier frequency (31), which appears in the lower sideband (32) and the upper sideband (33).

The exact energy which exits the image component separator (15) depends upon the size, shape, and locations of holes (18) and (19) in the separator. As a result of wavelength separation that occurs in dynamic interference images, the output can be made to contain any of the frequencies available within the volume. For example, if hole (18) is placed at the position where upper sideband energy accumulates such as at location (16), upper sideband (32) will be stronger in output (20) as depicted graphically by line (34).

As with electronic heterodyning, changing the frequency of at least one of the fundamental frequencies changes the frequency of the sideband. Arrows (35) and (36) depict the frequency shifts that result. The frequency shift can be in increments, as when changing channels, or continuously tuned. The adjustable fundamental frequency may be one modulated into the input, or inserted into the dynamic interference volume directly as described above.

Figure 4:
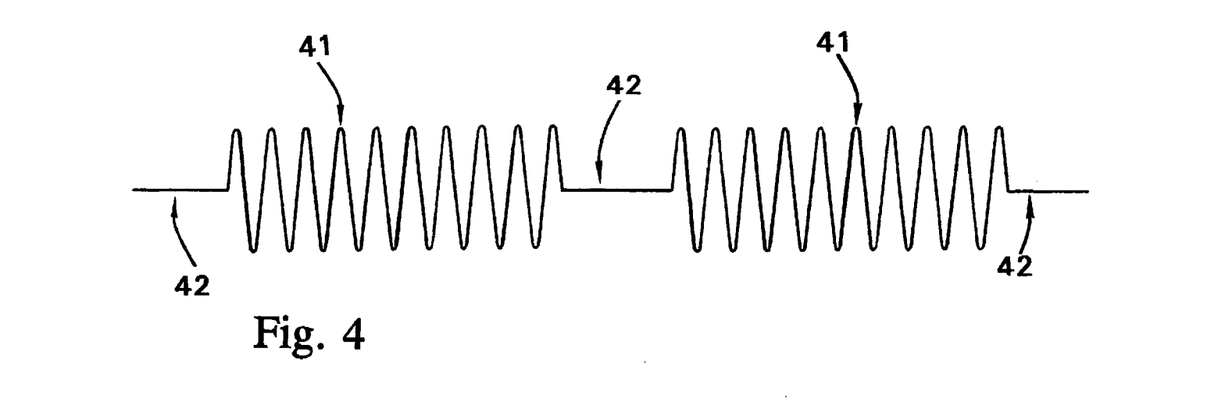
FIG. 4 shows a binary modulated sideband.

Double-modulating the input of the present invention produces sideband energy that is modulated with the lower of the two modulating frequencies. An example is shown in FIG. 4. Wave (41) is a continuous-wave subcarrier such as sidebands (32) or (33) of FIG. 3. The lower of the double-modulation frequencies is binary, so that sideband (41) is turned on (41) and off (42). As a result, the binary information is modulated onto the subcarrier sideband. The same thing happens with two photonic fundamental frequencies, where one of them is modulated with encoded information. As a result, encoded information at one fundamental carrier frequency can be transferred to another carrier (subcarrier) frequency just as in radio, but all photonically and without any conversion to electronics.

Figure 5:
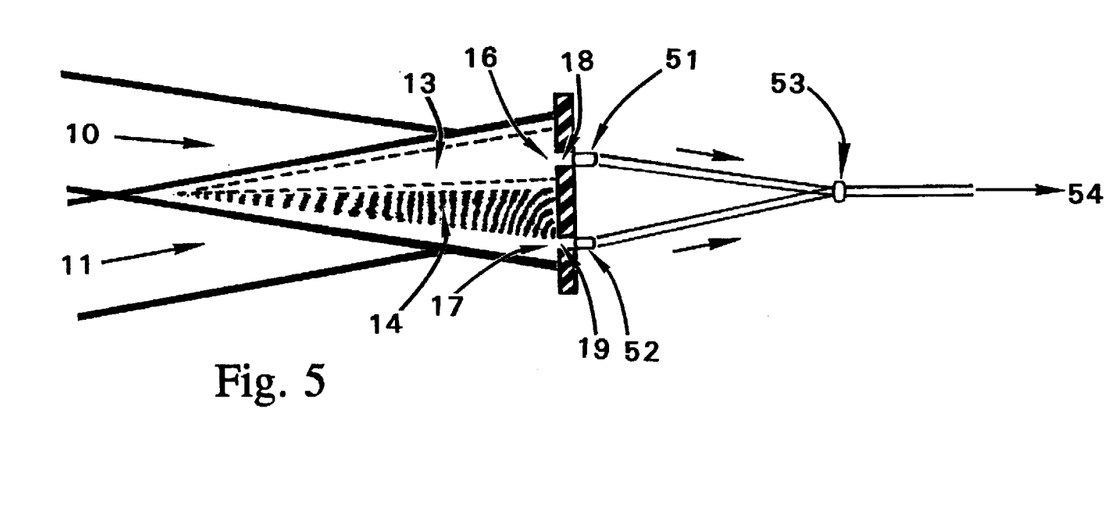
FIG. 5 is a cross-sectional view showing the photonic heterodyning device with combined energy output.

A dynamic interference image resulting from energy in volumes (13) and (14) of FIG. 5 contains many locations, such as (16) and (17), where the energy distributions are complementary. That is, the sideband energy at those different locations has the same modulation characteristics, but may or may not be in phase. At such locations passive phase adjusters (holograms, subhologram parts or other passive components), (51) and (52), can be used to change the phase of the sideband energy so that it arrives at the beam-combining element(s) (53) in phase. This produces a much stronger output at output (54) than would be produced at output (20) of FIG. 1. Many phase adjusters can be positioned so as to take advantage of substantially all available sideband energy locations.

An embodiment using Special Interference can also be depicted using FIG. 1. In this case, input beam (11) contains the fundamental frequencies and any encoded information. Input beam (10) contains energy at the intended subcarrier sideband frequency. Whereas the design of the dynamic interference image was previously optimized for photonic heterodyning alone, the dynamic interference in this case is optimized to include Special Interference which is used to provide internal amplification of the sideband energy produced by heterodyning.

When at least one of the fundamental frequencies of input beam (11) is absent, no sideband energy appears as a result of heterodyning. At that time, input beam (10) is directed away from location (16) and onto image component separator (15) at location (59). Consequently, none of this substantially constant sideband energy arrives at output (20) as long as no sideband energy is being produced as a result of photonic heterodyning.

When the two fundamental frequencies are both available, as a result of photonic heterodyning sideband energy appears in the dynamic image. However, because of the organization of the dynamic image and as a result of whatever energy-directing elements are used to produce the dynamic interference, the heterodyne-produced sideband is out of phase with the continuous-wave (power) sideband energy. DI occurs so that sideband energy from both sources is diverted away from volume (14). The law of conservation of energy requires that sideband energy be redistributed outside of volume (14) because of DI. Therefore, CI occurs in volume (13), causing sideband energy to appear in volume (13), where before there was no sideband energy from either source.

As the dynamic image is projected onto image component separator (15), this combination of heterodyne-produced sideband energy and continuous-wave power sideband energy appears at location (16) and in output (20). Output (20) contains more sideband energy than is produced directly by heterodyning because it gets it from two sources. As a result, output (20) is an amplified heterodyned signal.

Many practical results may be achieved using the above principles. Generally, every frequency and modulation combination found in radio practice can be accomplished with the present invention, with the advantages of continuous photonic action and full-spectrum operation.

Photonic heterodyning has many important uses, one of which is transferring information from one frequency channel to another. This is accomplished through selection of the input frequencies and/or modulation patterns so as to produce sideband frequencies at the desired output channel frequency. This energy can then be amplified or otherwise processed by subsequent components such as the ones described in copending application Ser. No. 08/357,460.

While the foregoing description of the preferred embodiment of the present invention has disclosed specific constructions, means, and methods of accomplishing the present invention, because specific improvements and modifications will become readily apparent to those skilled in the art of computers and optical devices and the like, it is applicant's intent not to be limited by any of the foregoing descriptions, but only by the claims which follow.

What is claimed is:

1. A method of photonic heterodyning comprising the following steps:

providing at least one input beam set of photonic energy having first and second fundamental frequencies to be heterodyned;

producing dynamic interference using energy of said at least one input beam set, and separating sideband energy from at least one location within said dynamic interference to provide at least one photonic output, said sideband energy being produced by movement of energy components within said dynamic interference relative to said at least one location.

2. The invention of claim 1 wherein said at least one location is a plurality of locations, and including the steps:

phase-adjusting said sideband energy at each of said plurality of locations, and directing said phase-adjusted sideband energy to at least one common location to provide a strengthened photonic output.

3. The invention of claim 1 wherein:

at least one of said fundamental frequencies is modulated with encoded information and said second fundamental frequency is a continuous-wave subcarrier modulated onto said first fundamental frequency, thereby modulating said sideband energy with said encoded information.

4. The invention of claim 3 wherein the frequency of said continuous-wave subcarrier is adjustable, thereby making the frequency of said sideband energy adjustable.

5. The invention of claim 1 preceded by the following step:

providing a power beam set having at least one substantially constant level beam of photonic energy at the frequency of said sideband energy;

and wherein:

said dynamic interference is produced using energy of said input beam set and said power beam set, and said sideband energy separated from said at least one location within said dynamic interference conforms to the tenets of special interference amplification, thereby providing a method of amplified photonic heterodyning.

6. A photonic mixer comprising:

an input beam set of photonic energy having first and second fundamental frequencies to be heterodyned, said input beam set being positioned and oriented so as to produce a dynamic interference image produced with energy of said input beam set, and an image component separator for separating energy from said dynamic interference image having energy of at least one sideband frequency produced by movement of energy components within said dynamic interference image to provide at least one photonic energy output at said sideband frequency.

* * * * *